Dec. 21, 1937.   F. J. BERRY   2,102,880
APPARATUS FOR DRY SEPARATION OF MATERIALS OF DIFFERENT DENSITIES
Filed Jan. 20, 1934
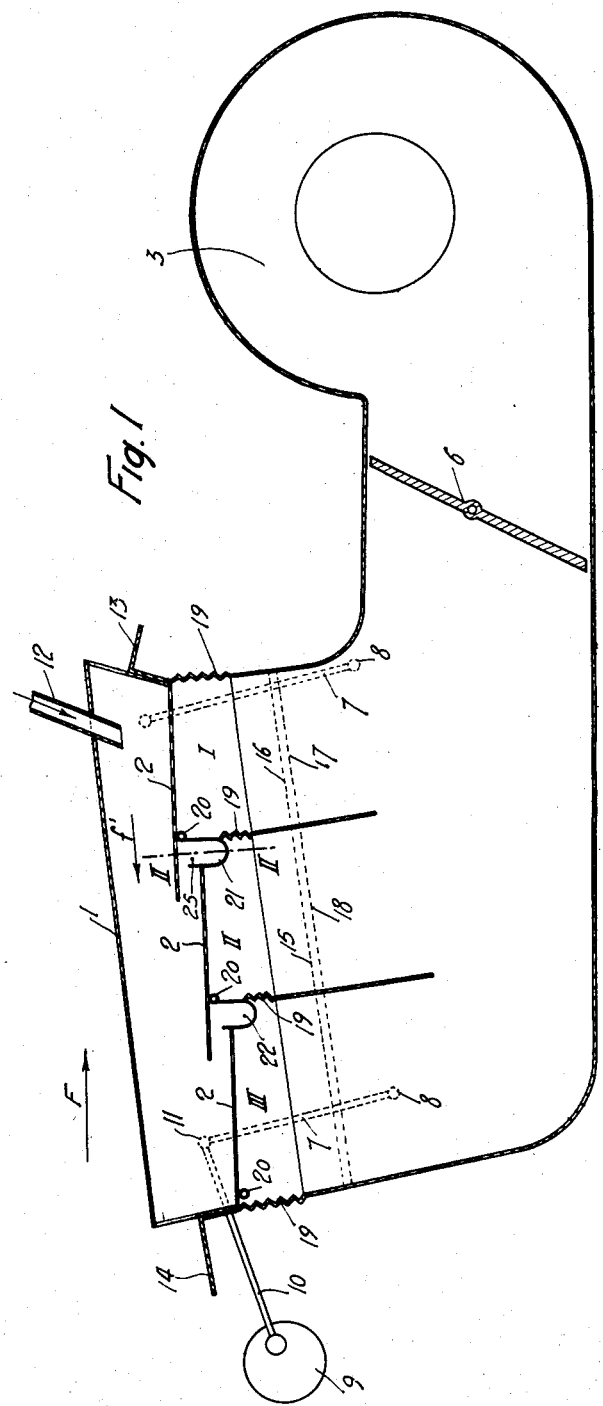
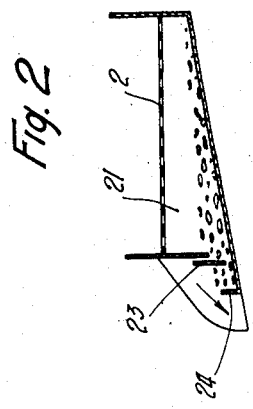
INVENTOR
Francois J. Berry
BY Townsend & Decker
ATTORNEYS Patented Dec. 21, 1937

2,102,880

UNITED STATES PATENT OFFICE 2,102,880

APPARATUS FOR DRY SEPARATION OF MATERIALS OF DIFFERENT DENSITIES

Francois Jacques Berry, Lille (Nord), France, assignor to Ateliers et Chantiers De La Manche, Dieppe, France, a corporation of France Application January 20, 1934, Serial No. 707,447
In France January 21, 1933

1 Claim. (Cl. 209—467)

The present invention relates to an apparatus for dry separation of materials of different densities, particularly for the separation of clean coal from the dirt which is usually mixed with it.

There are many methods and many kinds of apparatus for carrying out this operation; many such appliances comprise a frame with perforated base to which jerks are imparted, the materials to be separated being subjected to the action of a rising current of air. On account of the jerks the heavier and lighter materials to be separated are thrown upwards in different directions, the lighter materials being more retarded in their fall by the rising current of air so that the materials are classified at the same time in order of density. According to my invention I provide an apparatus of simple construction which will effectively separate a mass of materials of different densities into those of light densities, intermediate densities and heavy densities.

In the method of dry separation of substances of different density in accordance with the invention the mixture of heavier and lighter materials to be separated is distributed in a frame with perforated base to which are imparted successive lateral jerks in a certain direction and which always receives from below a rising current of air. The heavier materials fall into contact with the perforated base of this frame, while the lighter materials, retarded in their fall by the rising current of air, forms a mass in suspension above the bed of heavier materials. The latter as soon as they are in contact with the perforated base of the frame participate in the jerks which are imparted to it and move with it in the direction of these jerks, but slide over it without returning when the perforated base returns in the opposite direction. The heavier materials are thus progressively displaced on the perforated base of the frame in the direction of the vibrations imparted thereto and accumulate towards the corresponding edge of the frame, against which they rise as fresh material is fed into the frame until they reach the level of a discharge weir from which they fall. The lighter materials forming the mass in suspension above the bed of heavier materials are not subjected to the influence of the lateral jerks imparted to the frame and behave rather like a liquid which tends to flow towards the opposite side of the frame, from which these lighter materials pour by a suitably arranged weir.

On account of the accumulation of the heavier and the lighter materials towards two opposite sides of the frame, the approximate line of demarcation between the heavier and lighter products is a line which may be straight or curved but is always inclined upwards towards the discharge weir for the heavier products.

The invention provides thus the possibility of separately removing a middlings product, that is, a material having a density intermediate between the heavier and lighter materials, provided there is a sufficiently large proportion of these middlings. If, for example, the material being treated is coal, the middlings would be removed either with the clean coal or with the dirt, which would have the disadvantage either of considerably increasing the ash content of the clean coal or of removing with the dirt material which may have a certain commercial value.

According to the invention, to overcome this disadvantage it is possible to treat the mixture of materials to be separated in a series of successive compartments with perforated bases each traversed by a regulatable rising current of air and constituting an assembly moved in successive lateral jerks in one direction in such a manner that in each successive compartment the heavier products fall to the bottom, moving according to the process previously indicated in the direction of the jerks and being evacuated at the corresponding end of this compartment, while the lighter materials floating on the heavier flow in the opposite direction and are spilt over into the following compartment where a fresh selection is carried out in the same manner.

In practicing my invention a complete selection of the different materials according to their densities is achieved by simply adjusting the rising currents of air so that the apparatus is very flexible in operation.

In the accompanying drawing:

Fig. 1 is a section taken through the apparatus of the invention.

Fig. 2 is a vertical cross-section on the line II—II of Fig. 1.

In the form of Figure 1, 1 is a frame having a perforated base 2 which allows to pass a constant current of air produced by a fan 3 and supplied by the latter to a pipe 4 connected to the table 1 by means of a flexible sleeve 5. 6 is a damper for regulating the strength of the current of air.

The frame 1 is pivoted at the end of arms 7 which themselves are pivoted at fixed points 8, and it is actuated from an eccentric 9 by a connecting rod 10 pivoted at 11 to the frame; on account of this mechanical drive all the points of the frame 1 are subjected to successive movements from left to right.

The perforated base 2 of the frame may be horizontal or preferably more or less inclined to the horizontal as shown in the drawing.

12 is the inlet pipe for the materials to be separated which may be discharged at a point of the surface of the frame more or less near the centre.

Finally, 13 and 14 are two discharge weirs arranged at one end and the other of the frame 1 and intended for the discharge of the heavier and lighter materials respectively.

The operation of the apparatus is as follows:—

As the materials to be separated (for example clean coal and dirt) are distributed in the frame 1 they tend under the action of the rising current of air from the fan 3 to become classified into heavier products, which fall on to the base of the frame, and lighter products, which remain on the contrary at the upper part where they are in a sense suspended in the air; this suspension of lighter materials in the rising current of air has the properties of fluids and behaves rather like a surface of liquid A arranged above the mass B of heavier materials.

The heavier constituents, which comprise the lower bed B of little sensitiveness to the action of the rising current of air, as soon as they arrive in contact with the base of the frame, participate on the other hand in the movements of the frame from left to right, but slide on this perforated base when the frame returns towards the left; they thus proceed slowly from left to right on the base of the frame and gradually accumulate towards the right-hand end of the frame and rise up the corresponding edge of the latter until they reach the level of the discharge weir 13 as shown in Figure 1.

The lighter constituents forming the suspension A and having as has already been shown some of the properties of a fluid, are not subjected to the effect of the jerks imparted to the frame. They behave somewhat like the particles of a liquid and tend on the other hand under the effect of the inclination which may have been given to the base 2 of the frame, under the effect of the accumulation of heavier products towards the right hand edge of the latter, or under the effect of the continued arrival of fresh materials for treatment which tends to accumulate above the mouth of the pipe 12, to flow towards the left hand margin of the frame and to accumulate there until reaching the level of the discharge weir 14, which may if required be slightly lower than the discharge weir 13.

There is thus a traveling movement and a tendency to accumulation: on the one hand of the heavier materials in contact with the perforated base of the frame towards the right-hand margin of the latter, on the other hand of the lighter materials towards the left-hand margin of the frame; the heavier and lighter materials finally reach the level of the discharge weirs 14 and 13 respectively by which they are discharged from the apparatus continuously, to be collected then in any suitable manner.

To facilitate the travel of the heavier constituents from left to right it is possible to provide the perforated base 2 of the frame with projections, ribs or other suitable arrangements having the effect of assisting the drive of these constituents.

The suspension of lighter substances may be facilitated if care is taken to give to the movements imparted to the frame not only a component parallel to the base of the frame but also a slight vertical component.

According to the invention the frame 1 is divided into a series of compartments such as I, II, III, each having a perforated base 2 which allows a current of air to pass, and this current can be regulated for each one by means of a sliding damper, which may be constructed by way of example as a fixed plate 15 having apertures 16 more or less uncovered by a moving plate 17 having corresponding gaps 18. A flexible sleeve 19 connects the different compartments to the branches of the discharge pipe 4 of the fan 3, the total output of which is regulated by the damper 6.

The frame 1 is supported by arms 7 pivoted at fixed points 8 and it is actuated by the eccentric 9 and by means of the connecting rod 10 pivoted at 11 to the frame. Under the effect of this mechanical drive all the points of the frame I are subjected to successive movements from left to right.

The perforated bases 2 of the different compartments I, II, III may be horizontal or more or less inclined to the horizontal. This inclination may be made variable by the rotation of these bases about pivots such as 20.

12 is the inlet pipe for the materials to be treated. The point at which the latter fall into the compartment I may be shifted as desired. At 13 and 14 two discharge weirs are arranged at opposite ends of the frame 1 for the discharge of the heavier and lighter products respectively.

Products of intermediate density are removed by the troughs 21 and 22 which may if required be provided in such a manner that the air passing under the sieve 2 of one of the compartments II or III cannot escape directly through the apertures of these troughs. A method of construction according to this condition is shown in Figure 2. The chute such as 21 is transversely inclined in relation to the general axis of the table and the outlet for materials is regulated by a trap 23 and 24 forming a siphon and capable of being regulated. The one part of trap 23 and 24 is immersed in the materials passing along the chute and thus prevents the direct egress of air.

The apparatus operates in the following manner:

The raw materials arrive at compartment I by the chute 12 and are distributed in this first compartment and in consequence of the rising current of air regulated by the damper 15—17 are classified into very heavy materials which immediately fall to the lower part and lighter materials which remain in suspension at the upper part.

The very heavy constituents, only slightly sensitive to the action of the air, take part on the other hand in the movements of the frame from left to right; they thus pass gradually from left to right on the base of the compartment I and accumulate towards the right hand extremity of the frame rising along the corresponding edge of this frame and finally reach the level of the discharge weir 13 from which they are discharged.

The lighter constituents flow in the direction of the arrow f' and fall into the compartment II where a fresh treatment is carried out. The regulation of the current of air under this compartment permits the fall of the heavier constituents to the base of the compartment and the holding in suspension of the lighter constituents. The latter pass by flowing into the compartment III where the operations of classification and discharge are carried out in the same manner. The heavier constituents rise along the perforated base of compartment II and are removed by the chute 21, one edge 25 of which forms a discharge notch which may be capable of regulation as to height.

To facilitate the movement of the heavier materials from left to right it is possible, as has already been mentioned in connection with Figure 1, to provide the perforated bases 2 of the frame with projections, ribs or other suitable arrangements to assist the driving of these constituents.

Having now particularly described and ascertained the nature of said invention and in what manner the same is to be performed declare that what I claim is:—

In an apparatus for the dry separation of mixed substances of different densities, a plurality of juxtaposed compartments each comprising a frame with a perforated base and with each successive base overlapping and spaced above the preceding base, means for mounting the frame on an incline, means for vibrating the frames so as to advance the bottom layer of material up the incline while the top layer of material floats down the incline under the influence of gravity, means for supplying upwardly directed air currents through the perforated base, the end of the first base furthest from the second base providing a discharge for the heaviest materials and the opposite end of the last base of the series providing a discharge for the lightest materials, and discharging troughs between each pair of frames, each trough being at the end of a base and underlying so as to be entirely covered over by a preceding base whereby material of intermediate density may discharge in said trough by working under the preceding base after being discharged from said preceding base.

FRANCOIS JACQUES BERRY.